US012726021B2

(12) United States Patent
Wan et al.

(10) Patent No.: US 12,726,021 B2
(45) Date of Patent: Sep. 1, 2026

(54) MULTI-DOMAIN RC CLAMP CIRCUIT

(71) Applicant: GlobalFoundries U.S. Inc., Malta, NY (US)

(72) Inventors: Jing Wan, Milton, VT (US); Alain F. Loiseau, Williston, VT (US); Sagar Premnath Karalkar, North Chelmsford, MA (US)

(73) Assignee: GlobalFoundries U.S. Inc., Malta, NY (US)

( * ) Notice: Subject to any disclaimer, the term of this patent is extended or adjusted under 35 U.S.C. 154(b) by 144 days.

(21) Appl. No.: 18/903,708

(22) Filed: Oct. 1, 2024

(65) Prior Publication Data

US 2026/0095042 A1 Apr. 2, 2026

(51) Int. Cl.
*H02H 9/04* (2006.01)

(52) U.S. Cl.
CPC .................................. *H02H 9/046* (2013.01)

(58) Field of Classification Search
CPC ..................................................... H02H 9/046
USPC .......................................................... 361/56
See application file for complete search history.

(56) References Cited

U.S. PATENT DOCUMENTS 5,721,656 A * 2/1998 Wu ...................... H10D 89/601 361/111
7,394,638 B2 * 7/2008 Ahmad ................ H10D 89/819 361/111
7,570,468 B2 8/2009 Bernard et al.
7,839,612 B1 * 11/2010 Chan .................... H10D 89/819 361/56
8,643,988 B1 * 2/2014 Kwong .................. H02H 9/046 361/118
9,602,071 B2 * 3/2017 Tsai ........................ H01F 38/14
9,721,941 B2 * 8/2017 Hwang ................ H10D 64/516
10,109,998 B2 * 10/2018 Altaras .................... H02H 9/04
11,876,089 B2 * 1/2024 Chen ...................... H02H 9/046
12,009,657 B2 * 6/2024 Hung ..................... H02H 9/046
12,401,189 B2 * 8/2025 Lee ........................ H02H 9/045
12,519,307 B2 * 1/2026 Kim ....................... H02H 9/046
12,519,308 B2 * 1/2026 Ishiguro ................. H02H 9/046
12,538,585 B2 * 1/2026 Kang .................. H10D 89/819
12,573,843 B2 * 3/2026 Hsu ........................ H02H 9/046
2003/0107859 A1 * 6/2003 Pan ........................ H02H 9/001 361/58
2007/0076338 A1 * 4/2007 Traynor ............... H10D 89/819 361/56
2007/0223163 A1 * 9/2007 Hung .................. H10D 89/601 361/93.1

(Continued)

FOREIGN PATENT DOCUMENTS

CN 111276952 A 6/2020
KR 20110013223 A * 2/2011 ............. H03K 17/08

*Primary Examiner* — Dharti H Patel
(74) *Attorney, Agent, or Firm* — David Cain; Hoffman Warnick LLC

(57) ABSTRACT

A multi-domain RC clamp circuit. A circuit is provided that includes a first power domain having a first RC clamp with a first transistor arranged to bypass a first resistor of the first RC clamp; and a second power domain having a second RC clamp with a second transistor arranged to bypass a second resistor of the second RC clamp, wherein the second transistor is controlled by a first input from the first power domain and the first transistor is controlled by a second input from the second power domain.

20 Claims, 2 Drawing Sheets

(56) References Cited

U.S. PATENT DOCUMENTS

| | | | | |
|---|---|---|---|---|
| 2011/0038084 | A1* | 2/2011 | Lo | H02H 9/046<br>361/56 |
| 2013/0235498 | A1* | 9/2013 | Lai | H03K 19/00315<br>361/56 |
| 2013/0321961 | A1* | 12/2013 | Lin | H02H 9/046<br>29/825 |
| 2014/0334046 | A1* | 11/2014 | Haruki | H02H 9/046<br>361/56 |
| 2015/0155707 | A1* | 6/2015 | Truong | H02H 9/046<br>361/56 |
| 2015/0288172 | A1* | 10/2015 | Yeh | H02H 9/046<br>361/56 |
| 2015/0288173 | A1* | 10/2015 | Chen | H02H 9/046<br>361/56 |
| 2015/0333508 | A1* | 11/2015 | Ko | H10W 42/60<br>361/56 |
| 2019/0260203 | A1* | 8/2019 | Seidl | H10D 89/814 |
| 2024/0372360 | A1* | 11/2024 | Davis | H02H 9/046 |
| 2025/0246900 | A1* | 7/2025 | Sivakumar | H02H 9/025 |
| 2026/0095042 | A1* | 4/2026 | Wan | H02H 9/046 |

* cited by examiner

MULTI-DOMAIN RC CLAMP CIRCUIT

BACKGROUND

The present disclosure relates generally to RC clamp circuits, and, more particularly, to a multi-domain RC clamp circuit that allows for faster power ups.

The use of resistor/capacitor (RC) clamp circuits is one approach for managing electrostatic discharge (ESD) in integrated circuits. ESD is a momentary and sudden electric current that flows when an excess of electric charge, stored on an electrically insulated structure, finds a path to a structure at a different electrical potential such as ground. ESD is a particularly serious concern with microelectronic devices. RC clamp circuits are designed to detect an ESD event and protect an associated circuit or system.

SUMMARY

All aspects, examples and features mentioned below can be combined in any technically possible way.

An aspect of the disclosure provides a circuit, including: a first power domain having a first RC clamp with a first transistor arranged to bypass a first resistor of the first RC clamp; and a second power domain having a second RC clamp with a second transistor arranged to bypass a second resistor of the second RC clamp, wherein the second transistor is controlled by a first input from the first power domain and the first transistor is controlled by a second input from the second power domain.

Another aspect of the disclosure provides an integrated circuit, including a first power domain having a first RC clamp with a first transistor arranged to bypass a first resistor of the first RC clamp, the first RC configured to protect a first system in the first power domain; and a second power domain having a second RC clamp with a second transistor arranged to bypass a second resistor of the second RC clamp, the second RC clamp configured to protect a second system in the second power domain, wherein the second transistor is controlled by a first input from the first power domain and the first transistor is controlled by a second input from the second power domain.

A further aspect provides a circuit, including: a first power domain having a first power supply; and a second power domain having an RC clamp with a transistor arranged to bypass a resistor of the RC clamp, wherein the transistor is controlled by a power supply input from the first power domain.

Two or more aspects described in this disclosure, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein.

Figure 1:
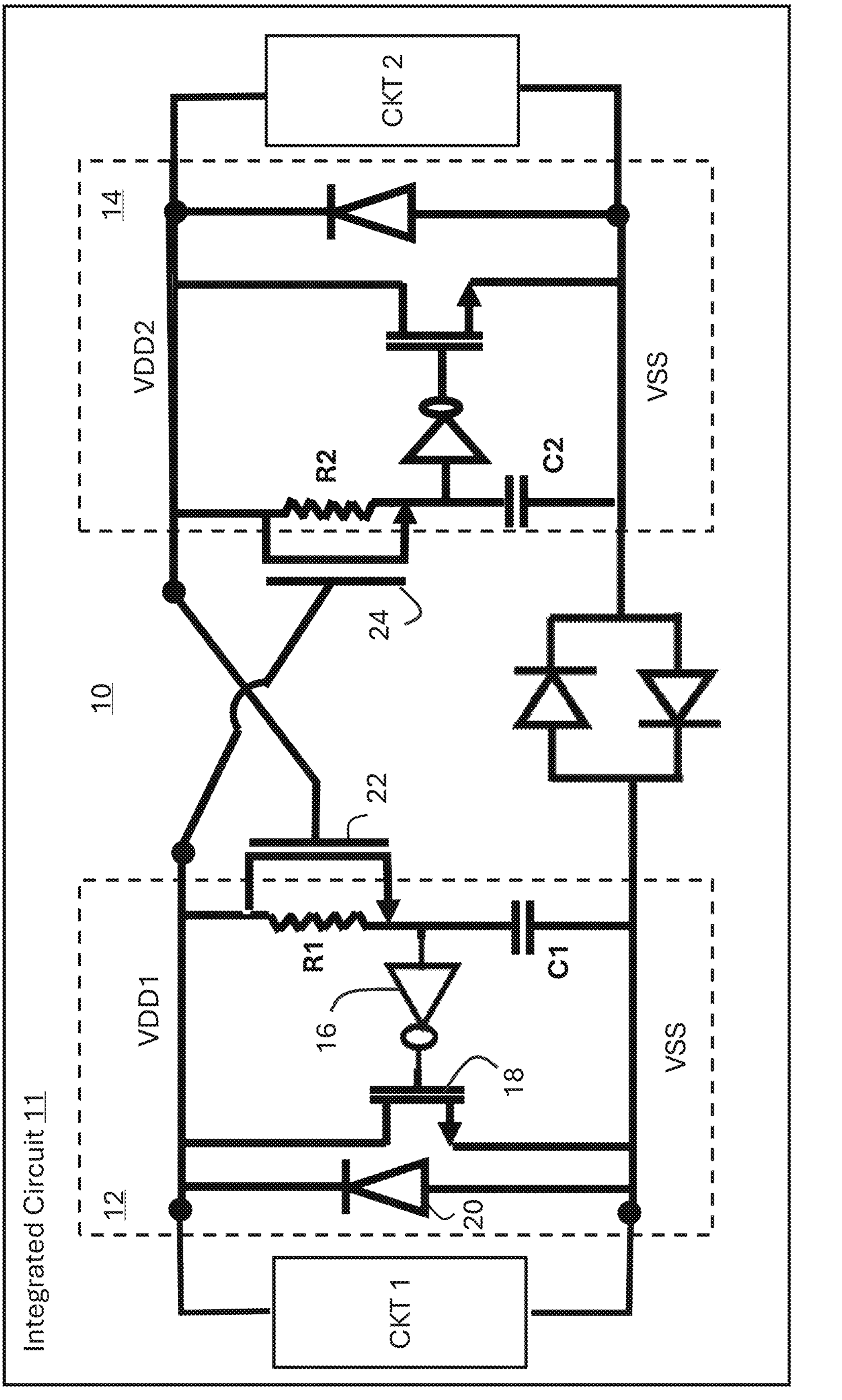
FIG. 1 shows a block diagram of an integrated circuit having a multi-domain RC clamp circuit, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Embodiments of this disclosure provide a multi-domain RC clamp circuit in which an RC clamp in a first VDD domain can be disabled by a field effect transistor (FET) gated by a VDD signal from a second VDD domain. Disabling of the RC clamp allows a system being protected by the RC clamp to be powered up quickly.

As noted, an integrated circuit is potentially susceptible to electrostatic discharge that may damage the underlying integrated circuit such that it is unreliable or ineffective during operation. RC clamps are often used to provide electrostatic discharge (ESD) protection to such integrated circuits. Namely, the RC clamp detects when an input node (e.g., VDD node) has a fast-rising edge (typically indicative of an ESD event) and, in response, provides a discharge mechanism for discharging ESD that becomes present between the supply node VDD and VSS (e.g., ground). However, one of the drawbacks of using RC clamps is that they require a slower VDD ramp up time for the system being protected during power up so that the fast-rising edge of VDD is not detected as an ESD event and, thus any unintended RC clamp triggering is avoided. Various systems, such as certain power supplies and ultra-low leakage applications, require fast ramp up times, and therefore cannot use normal RC clamps as they can unintentionally trigger the RC clamp during power up.

FIG. 1 depicts an integrated circuit (IC) 11 having a multi-domain clamp circuit 10 that operates in two different power supply domains VDD1 and VDD2. Each domain includes an RC clamp 12, 14, which for example provides ESD protection for a protected system, in this case circuits CKT 1 and CKT 2, in their respective domains. Utilizing different domains, e.g., allows different parts of integrated circuit 11 to be separately powered on and off, allowing for enhanced power management and overall power savings. Accordingly, integrated circuit 11 in this embodiment allows VDD1 and VDD2 to power on and off at different times.

In the embodiment of FIG. 1, the RC clamps 12, 14 in both domains VDD1, VDD2 are generally identical (but shown as mirror images). RC clamp 12 includes a resistor R1 in series with a capacitor C1, positioned between the supply voltage VDD1 and ground VSS. An inverter 16 and transistor 18 are coupled in series to a node between resistor R1 and capacitor C1. The source and drain of transistor 18 are coupled to the VDD1 and VSS, and transistor 18 is gated by the output of the inverter 16. For purposes of illustration, transistor 18 is an N-type metal oxide semiconductor (NMOS) field effect transistor (FET), with its drain connected to VDD1 and its source connected to VSS. Transistor 18 accordingly turns on and conducts current when the drain and gate of the transistor 18 are at a higher potential than the source of the transistor 18. However, when the gate of transistor 18 is at the same potential as the source, transistor 18 is switched to and remains in an off state. Accordingly, when an ESD is present at VDD1, transistor 18 is turned on for a period of time which provides a discharge path between VDD1 and VSS, and ensures that the ESD does not impact CKT 1. The duration of the on state is determined by the time constant of RC clamp 12 (i.e., determined by the values of R1 and C1). Diode 20 provides a discharge path in the reverse direction, which addresses any negative current.

RC clamp 12 however has the effect of requiring VDD1 to power up CKT 1 relatively slow during normal operations. Otherwise, if the power up occurs too quickly, capacitor C will not have time to charge and transistor 18 will turn on, i.e., the RC clamp 12 will act as though an ESD event is occurring and CKT 1 will not be powered.

To address this issue in a multi-domain environment, a field effect transistor (FET) 22, whose gate is controlled by an input from a different domain (VDD2), provides a shunt to disable the RC clamp 12. FET 22 in this example comprises an n-type device with a drain and source coupled to an input and output of resistor R1 and a gate coupled to the VDD2 power supply. When VDD2 is powered on and present at the gate of FET 22, and VDD1 is subsequently powered up, current from VDD1 bypasses resistor R1, disabling the RC effect, and turns off transistor 18. The protected circuit (CKT 1) in the VDD1 domain therefore does not require a slow ramp up time since the RC clamp 12 is disabled.

In the embodiment depicted in FIG. 1, the RC clamps 12, 14 of both domains VDD1, VDD2 include a respective FET 22, 24 to shunt its resistor R1, R2, respectively, when the other domain is powered up first. Thus, if VDD1 is powered up first, the presence of an established power supply from VDD1 will shunt resistor R2 and disable the RC clamp 14 in the VDD2 domain, allowing CKT 2 to be quickly powered up. Conversely, if VDD2 is powered up first, the presence of an established power supply from VDD2 will shunt resistor R1 and disable the RC clamp 12 in the VDD1 domain, allowing CKT 1 to be quickly powered up. It is understood that different types of RC clamps may be used in the two domains, i.e., they need not be identical. It is also understood that one of the two domains may not include a FET to disable its RC clamp, e.g., if one domain is always powered up first. Further, while the depicted circuit 10 utilizes n-type devices, it is understood that a similar circuit with p-type devices could likewise be utilized.

Figure 2:
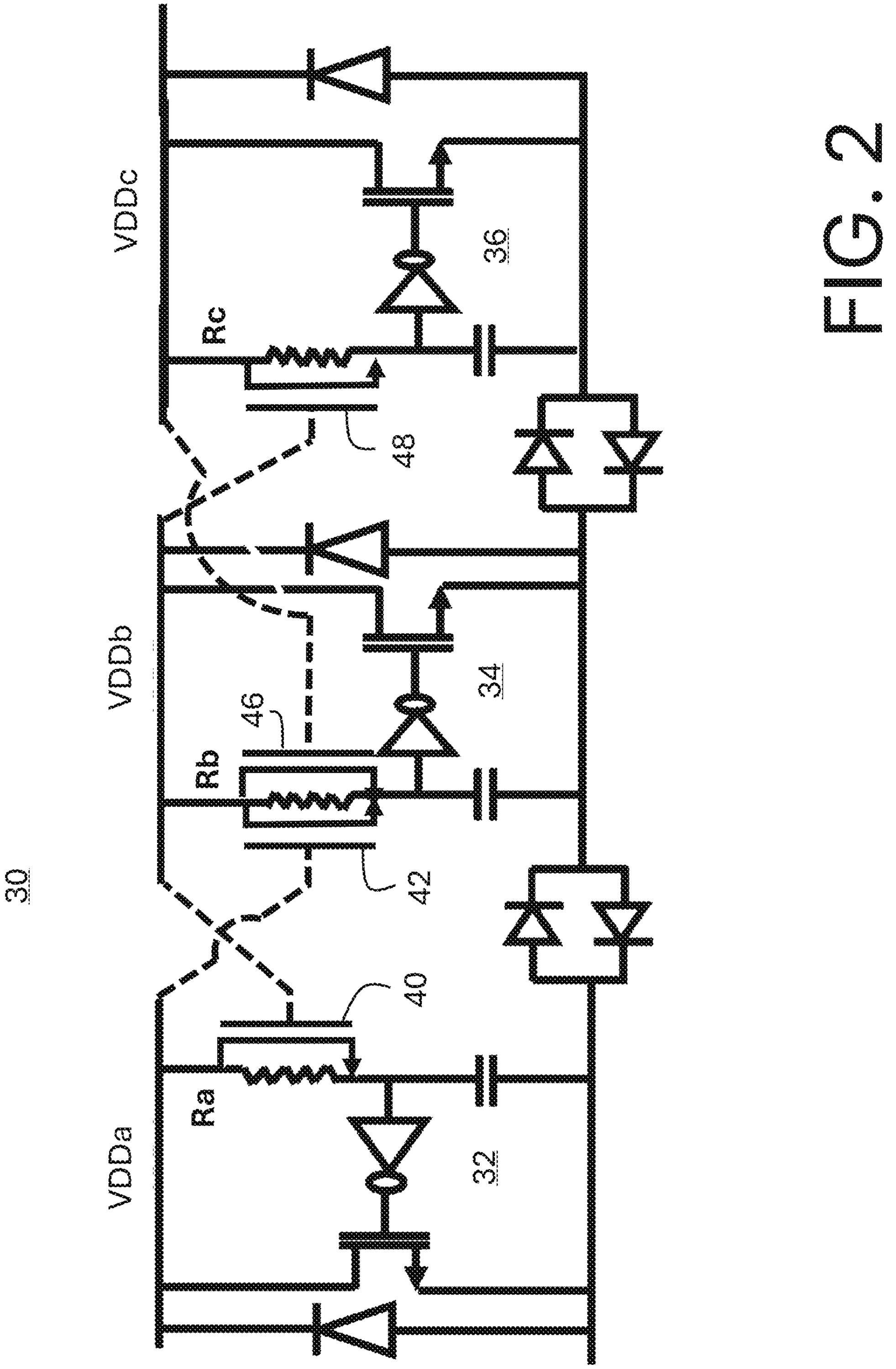
FIG. 2 shows a block diagram of an N domain RC clamp circuit, according to embodiments of the disclosure.

FIG. 2 depicts a further embodiment of a multi-domain clamping circuit 30 having N domains (in this case N=3). In this example, there are three voltage domains VDDa, VDDb and VDDc, each having an RC clamp 32, 34, 36 to protect an associated system (not shown). As shown, resistor Ra can be shunted with FET 40, resistor Rb can be shunted with either FET 42 or FET 46, and resistor Rc can be shunted by FET 48. In this case, when VDDb is powered up, it disables the RC clamps 32, 36 in the VDDa and VDDc domains. When either VDDa or VDDc are powered up, they disable RC clamp 34. It is understood that in various alternative embodiments, other arrangements could be implemented, e.g., each of the VDD domains could be configured to disable all of the other RC clamps, two or more RC clamps could be disabled by two or more VDD domains, domains could be set up in a sequential manner such that the RC clamp in each domain is disabled by an adjacent domain, etc. Further, any number of additional voltage domains having additional RC clamps could be utilized.

An added benefit of the disclosed embodiments with the added FETs is that noise and leakage are kept low, e.g., with rise times down to about 25 nanoseconds, as opposed to rise times about seven microseconds for just a normal RC clamp.

The terminology used herein is for the purpose of describing particular embodiments only and is not intended to be limiting of the disclosure. As used herein, reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (A) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed. It will be further understood that the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not. It will be further understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A circuit, comprising:

a first power domain having a first RC clamp with a first transistor arranged to bypass a first resistor of the first RC clamp; and a second power domain having a second RC clamp with a second transistor arranged to bypass a second resistor of the second RC clamp, wherein the second transistor is controlled by a first input from the first power domain and the first transistor is controlled by a second input from the second power domain.

2. The circuit of claim 1, wherein the first transistor and the second transistor comprise n-type field effect transistors.

3. The circuit of claim 2, wherein the second input is coupled to a gate of the first transistor, and wherein presence of an established power supply at the gate disables the first RC clamp.

4. The circuit of claim 2, wherein the first input is coupled to a gate of the second transistor, and wherein presence of an established power supply at the gate disables the second RC clamp.

5. The circuit of claim 1, further comprising at least one additional power domain, each having an additional RC clamp with an additional transistor arranged to bypass an additional resistor in the additional RC clamp.

6. The circuit of claim 5, wherein the additional transistor is controlled by the first input from the first power domain.

7. The circuit of claim 5, wherein the at least one additional power domain includes a first additional transistor controlled by the first power domain and second additional transistor controlled by the second power domain.

8. The circuit of claim 1, wherein the first RC clamp includes the first resistor and a capacitor arranged in series with a node therebetween, and an inverter and a metal oxide semiconductor field effect transistor coupled to the node in series.

9. An integrated circuit, comprising:

a first power domain having a first RC clamp with a first transistor arranged to bypass a first resistor of the first RC clamp, the first RC configured to protect a first system in the first power domain; and a second power domain having a second RC clamp with a second transistor arranged to bypass a second resistor of the second RC clamp, the second RC clamp configured to protect a second system in the second power domain, wherein the second transistor is controlled by a first input from the first power domain and the first transistor is controlled by a second input from the second power domain.

10. The integrated circuit of claim 9, wherein the first transistor and the second transistor comprise n-type field effect transistors.

11. The integrated circuit of claim 10, wherein the second input is coupled to a gate of the first transistor, and wherein presence of an established power supply at the gate disables the first RC clamp.

12. The integrated circuit of claim 10, wherein the first input is coupled to a gate of the second transistor, and wherein presence of an established power supply at the gate disables the second RC clamp.

13. The integrated circuit of claim 9, further comprising at least one additional power domain, each having an additional RC clamp with an additional transistor arranged to bypass an additional resistor in the additional RC clamp.

14. The integrated circuit of claim 13, wherein the additional transistor is controlled by the first input from the first power domain.

15. The integrated circuit of claim 13, wherein the at least one additional power domain includes a first additional transistor controlled by the first power domain and second additional transistor controlled by the second power domain.

16. The integrated circuit of claim 9, wherein the first RC clamp includes the first resistor and a capacitor arranged in series with a node therebetween, and an inverter and metal oxide semiconductor field effect transistor coupled to the node in series.

17. The integrated circuit of claim 9, wherein the first system comprises a power supply.

18. A circuit, comprising:

a first power domain having a first power supply; and a second power domain having an RC clamp with a transistor arranged to bypass a resistor of the RC clamp, wherein the transistor is controlled by a power supply input from the first power domain.

19. The circuit of claim 18, wherein the RC clamp is configured to protect a power supply in the second power domain.

20. The circuit of claim 18, wherein the transistor comprises an n-type field effect transistor, wherein the power supply input is coupled to a gate of the transistor, and wherein presence of an established power supply at the gate disables the RC clamp.

* * * * *